Patented Sept. 1, 1936

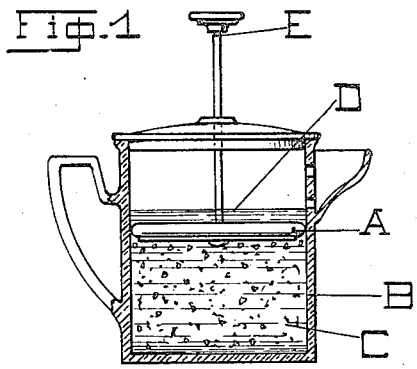

2,053,021

UNITED STATES PATENT OFFICE 2,053,021

APPARATUS FOR FILTRATION OF INFUSIONS

Bruno Cassol, Milan, Italy, assignor to Gemma Barelli Moneta, Milan, Italy

Application February 26, 1935, Serial No. 8,390
In Italy March 2, 1934

4 Claims. (Cl. 53—3)

The present invention has for its subject matter a sliding filter for apparatus for the preparation and filtration of infusions, especially of coffee infusion.

The subject matter of the invention comprises a type of filter specially intended for apparatus in which the separation is obtained of the liquid from the solid matter employed for the infusion by sliding a filtering organ pistonwise in the vessel of the apparatus. The filtering organ divides the vessel into two chambers, in one of which the solid matter is compressed, while the filtered infusion ready for use remains in the other chamber.

In the particular case of coffee infusion, the advantage offered by vessels of vitreous or ceramic material over metal vessels is well known. However the filters thus far known do not completely solve the problem of maintaining the complete and continuous contact of the filter packing against the cylindrical wall of the vessel so as to secure a satisfactory tightness, owing to the inaccuracies in the internal diameter of the vessel which are unavoidable in the workmanship of vitreous and ceramic vessels.

The present invention obviates the said inconvenience and is essentially characterized by the fact that the constant tightness between the filter and the inner surface of the vessel is secured by a resilient packing member, either continuous or consisting of several elements, the action of said packing member being assisted by means adapted to keep it in place in order that it may receive a gauze covering or the like preventing the passage of the solid matter particles and so arranged as to form a single unit with the other parts making up the filter.

In the preferred embodiment of the invention, the resilient packing member for obtaining efficient tightness, comprises a helical spring peripherally secured to the filter. The filter may be built up of two flat discs each provided with perforations and pressed together by a screw-threaded spindle. One of the discs has an upstanding peripheral edge pierced with holes, in which engage the coils of the spring, the spring portion in contact with the inner surface of the vessel being suitably covered.

This covering may be effected by bending the projecting edge of the filtering gauze which is secured between the two discs.

As the flexible packing of this embodiment adheres to the inner surface of the vessel at all points, a radial expansion of the elements always occurs thus holding them during reciprocation in contact with the inner surface of the vessel and in this manner an effective tightening is obtained between the packing and the inner surface of the vessel.

In a modified form, the disc intended to receive the flexible packing member may be provided with oblong radial windows in which the coils of the spring engage.

Also in this case the elastic tightening action of the flexible packing determines a radial displacement of the coils practically in the same plane so that the friction set up by reciprocating the filter is relatively small.

In a further modification of the flexible packing, the same may be built up of several elements or loops, substantially in the form of meshes the ends of which are inserted through corresponding holes pierced in the upstanding edge provided on one of the filter discs and these holes being all arranged in the same plane which is perpendicular to the axis of the cylindrical vessel, that is so that the loops lie in one plane. The meshes or loops may also be arranged in planes perpendicular to that of the discs. In a further modified construction the flexible packing is of the helical type, but provided with a metal core and arranged between the two filter discs in a suitable annular recess formed by them.

The invention will now be described with reference to the accompanying drawing in which the invention is illustrated, only by way of example, in the four embodiments above mentioned.

Fig. 1 shows the filter as applied to a coffee pot of vitreous or ceramic material, the figure being substantially a full section.

Fig. 2 is a part section to a larger scale showing the filter according to Fig. 1.

Fig. 3 is a sectional part plan view as seen from above relatively to Fig. 2.

Figs. 4 and 5 are respectively a part plan view and a part vertical section showing a modification of the flexible packing. Figures 6 and 7 show respectively a partial plan view and a cross section of a modified construction of the packing.

Fig. 8 shows a different modification of the packing elements in partial vertical section; and Fig. 9 shows in part longitudinal section still another modified construction of the flexible packing, with a different arrangement of the elements making up the filter.

In Figs. 1, 2 and 3 of the drawing, A is the filter, B the vessel, C the solid matter employed for the infusion, D the filtered out infusion, and E the spindle operating the filter A.

In the embodiment illustrated by Figs. 1 to 3 the filter A comprises two discs 1 and 2 provided with openings 4 and 3 respectively for passage of the infusion. The upper disc 1 is provided with an edge or flange 5, to which the flexible packing 6 is secured by threading the turns or coils 7 thereof through the holes 8 of the flange 5; the said packing at its zone of contact with the inner surface of the vessel, is covered by the suitably bent edge 9 of the filtering gauze 10.

The gauze 10 is inserted between the two discs 1 and 2, which are drawn tightly together by the screw-threaded end 11 of the spindle E engaging the screw 12 securing the bottom disc 2 of the filter.

In the modified construction shown by Figs. 4 and 5, 1a is the upper disc to which the springy packing is attached, the spring coils 7a of the packing engaging in the oblong windows 8a of the disc 1a.

In the modified construction shown in Figs. 6 and 7 the flexible packing 6b is made up of a plurality of elements or loops 7b independent from one another, the ends 13 of which engage in the holes 8b of disc 1b by slightly pressing the sides of the elements or loops 7b.

In this modified construction the elastic elements or loops are stressed in their longitudinal direction, a larger contacting zone being thus obtained which produces the pressure of the filtering gauze or element interposed between the said loops and the inner surface of the vessel.

Fig. 8 shows a different arrangement of the spring elements 7b from that of the preceding constructions, the said elements being here arranged in planes at right angles to that of the discs.

In the modified construction according to Fig. 9 the flexible packing 6c is again of the helical type, but a core 14 is arranged inside the helical packing, the latter being lodged in an annular recess formed by the two discs 1c and 2c, and a flange 16 formed on the disc 1c, which flange abuts against the filtering gauze and forces it against the disc 2c. The edge 9 of the gauze is bent so as to cover the packing ring 6c.

It is obvious that the flexible packing may have a covering of its own, independently from the filtering gauze 10, and for such a covering the material which is best suited for the end in view may be chosen.

Of course the constructive details, arrangement, materials, dimensions, etc. may be varied in practice in any convenient manner.

What I claim and desire to secure by United States Letters Patent is:

1. An apparatus for the preparation and filtering of infusions, comprising a cup-shaped vessel, a perforated piston reciprocable in the vessel, a resilient packing member around the edge of said piston, said resilient packing member, comprising open looped elements engaging in apertures provided in the periphery of the piston, a filtering element attached to said piston, a covering interposed between said packing member and inner surface of the vessel, and means adapted to hold said covering in place on said piston; in such a manner that the packing may effect considerable radial displacement.

2. An apparatus according to claim 1, in which the resilient packing member comprises a wire spring of a suitable material, said piston consisting of two perforated discs, a threaded spindle and a screw member engaging said spindle thereby tightly securing said discs together, one of the discs having a peripheral edge provided with holes constituting said apertures for engaging the spring, said filtering member consisting of gauze inserted between said discs and having its peripheral edge projecting beyond the edges of the discs thus also constituting the covering for said flexible member.

3. An apparatus according to claim 1 in which said resilient packing member comprises a single helically wound wire, the coils of which are engaged in oblong slots radially formed in one of said discs.

4. An apparatus according to claim 1, in which the resilient packing member is built up of a plurality of loops, the ends of which engage in holes provided in the edge of one of the filter discs.

BRUNO CASSOL.